United States Patent [19]

Lew et al.

[11] Patent Number: 5,501,106
[45] Date of Patent: Mar. 26, 1996

[54] INERTIA FORCE FLOWMETER WITH PIVOTALLY SUPPORTED VIBRATING CONDUIT

[76] Inventors: Hyok S. Lew; Yon S. Lew; Yon K. Lew, all of 7890 Oak St., Arvada, Colo. 80005

[21] Appl. No.: 152,370

[22] Filed: Nov. 16, 1993

[51] Int. Cl.⁶ ............................................. G01F 1/84
[52] U.S. Cl. ............................ 73/861.038; 73/861.038
[58] Field of Search ............................. 73/861.38, 861.37

[56] References Cited

U.S. PATENT DOCUMENTS

| | | | |
|---|---|---|---|
| 3,108,475 | 10/1963 | Henderson | 73/861.38 |
| 5,355,737 | 10/1994 | Lew et al. | 73/861.38 |
| 5,359,901 | 11/1994 | Lew et al. | 73/861.38 |

*Primary Examiner*—Richard Chilcot
*Assistant Examiner*—Jewel V. Artis

[57] ABSTRACT

A mass flowmeter comprises at least one conduit supported by a frame structure in a relationship allowing an enhanced pivotal vibration about two mutually orthogonal pivot axes, an electromagnetic vibrator generating a primary pivotal vibration of the conduit about one of the two mutually orthogonal pivot axes, and a pair of vibration sensors respectively included in two opposite halves of the conduit respectively located on two opposite sides of a plane including the other of the two mutually orthogonal pivot axes; wherein the mass flow rate of media moving through the conduit is determined as a function of an electrical variable such as the phase angle difference between two alternating electrical signals respectively generated by the pair of vibration sensors, which electrical variable represents the ratio of the amplitude of the secondary pivotal vibration to the amplitude of the primary pivotal vibration.

22 Claims, 4 Drawing Sheets

INERTIA FORCE FLOWMETER WITH PIVOTALLY SUPPORTED VIBRATING CONDUIT

FIELD OF THE INVENTION

This invention relates to a type of mass flowmeter commonly known as the Convective Inertia Force Flowmeter or Coriolis Force Flowmeter, that measures the mass flow rate of media moving through the vibrating conduit included in the mass flowmeter.

BACKGROUND OF INVENTION

Without any exceptions, the existing types of the Convective Inertia Force flowmeter or Coriolis Force flowmeter employ a single or a pair of conduits with two opposite extremities fixedly anchored to a supporting structure, wherein the single or pair of conduits are flexurally vibrated by a electromagnetic vibrator exerting a vibratory force on the midsection or midsections of the conduits, and the mass flow rate of media moving through the single or pair of conduits is determined as a function of an electrical parameter representing a phase angle difference in the flexural vibration of the single or pair of conduits between the two opposite halves thereof. As the individual conduits under the flexural vibration included in the existing types of the inertia force flowmeter have the two opposite ends fixedly anchored to a supporting structure, the amplitude of the flexural vibration of the individual conduit generated by the electromagnetic vibrator is limited to a very small value in the absolute sense as well as in the relative sense with respect to the length of the individual conduit, and consequently, the phase angle difference in the flexural vibration between the two opposite halves of the individual conduit is also limited to a very small value, e.g., less than five degrees. Therefore, the existing types of the inertia force flowmeter lack the sensitivity required to measure low mass flow rates of liquid media and any mass flow rate of gaseous media.

A simple mathematical analysis of the mechanical principles governing the working of the inertia force flowmeter shows that the secondary flexural vibration of the individual conduit under the flexural vibration generated by the electromagnetic vibrator, which secondary flexural vibration results from a dynamic interaction between the primary flexural vibration generated by the electromagnetic vibrator and the convective motion of media moving through the individual conduit, can have an amplitude comparable to the amplitude of the primary flexural vibration, and the phase angle difference in the resultant flexural vibration between the two opposite halves of the individual conduit can be significantly greater than five degrees, when the primary flexural vibration has a large amplitude and the structural constraint against the secondary flexural vibration is completely eliminated or limited to a low level. The present invention teaches the construction of a inertia force comprising a single or a pair of individual conduits accommodating a primary flexural vibration of a sizable amplitude and facilitating a secondary flexural vibration of a significant amplitude.

BRIEF SUMMARY OF INVENTION

The primary object of the present invention is to provide an inertia force mass flowmeter comprising at least one conduit that is pivotally supported about a first axis by a supporting structure in a relationship allowing a pivotal vibration of the conduit having a sizable amplitude about the first axis, whereby an electromagnetic vibrator generates a primary pivotal vibration of the conduit with a sizable amplitude about the first axis, wherein the mass flow rate of media moving through the conduit is determined as a function of an electrical variable representing the normalized level of the secondary pivotal vibration of the conduit about a second axis substantially perpendicular to the first axis, which normalized level of the secondary pivotal vibration defined as the ratio of the amplitude of the secondary pivotal vibration to the amplitude of the primary pivotal vibration is best represented by the phase angle difference in the resultant pivotal vibration of the conduit between the two opposite halves of the conduit.

Another object is to provide the inertia force flowmeter described in the afore-mentioned primary object of the present invention, wherein the supporting structure supports the conduit also pivotally about the second axis.

A further object is to provide an inertia force mass flowmeter comprising a pair of conduits, wherein each of the pair of conduits has the construction described in the afore-mentioned primary object of the present invention, and an electromagnetic vibrator generating a primary relative pivotal vibration between the pair of conduits about the respective first axes located parallel one another; wherein the mass flow rate of media is determined as a function of an electrical variable representing the normalized level of the secondary relative pivotal vibration between the pair of conduits about the respective second axes located parallel to one another, which normalized level of the secondary relative pivotal vibration is best represented by the phase angle difference in the resultant relative pivotal vibration between the pair of conduits between the two opposite halves of the combination of the pair of conduits.

Yet another object is to provide the inertia force mass flowmeter described in the afore-mentioned a further object of the present invention, wherein each of the pair of conduits is supported by the supporting structure also pivotally about the respective second axis.

Yet a further object is to provide an inertia force mass flowmeter comprising at least one conduit that is pivotally supported about a first axis by a supporting structure, and an electromagnetic vibrator generating a primary pivotal vibration about a second axis perpendicular to the first axis, wherein the mass flow rate of media moving through the conduit is determined as a function of an electrical variable representing the normalized level of the secondary pivotal vibration of the conduit about the first axis, which normalized level of the secondary pivotal vibration is best represented by the phase angle difference in the resultant pivotal vibration of the conduit between the two opposite halves of the conduit.

Still another object is to provide an inertia force mass flowmeter comprising a pair of conduits, wherein each of the pair of conduits has the construction described in the afore-mentioned yet a further object of the present invention, and an electromagnetic vibrator generating a primary relative pivotal vibration between the pair of conduits about the respective second axes located parallel to one another; wherein the mass flow rate of media is determined as a function of an electrical variable representing the normalized level of the secondary relative pivotal vibration between the pair of conduits about the respective first axes located parallel to one another, which normalized level of the secondary relative pivotal vibration is best represented by the phase angle difference in the resultant relative pivotal vibration between the pair of conduits between the two opposite halves of the combination of the pair of conduits.

Still a further object is to provide the inertia force mass flowmeters described in the afore-mentioned objects of the present invention, wherein the individual conduit included in the mass flowmeter is supported by the supporting structure about the first axis in a substantially freely pivoting, or elastically biased pivoting, or in a combination of the substantially freely pivoting and the elastically biased pivoting relationship about the first axis.

Yet still another object is to provide the inertia force mass flowmeters described in the afore-mentioned objects of the present invention, wherein the individual conduit included in the mass flowmeter is supported by the supporting structure about the second axis in a substantially freely pivoting, or elastically biased pivoting, or in a combination of the substantially freely pivoting and the elastically biased pivoting relationship about the second axis.

These and other objects of the invention will become clear as the description of the invention progresses.

BRIEF DESCRIPTION OF FIGURES

The present invention may be described with a greater clarity and specificity by referring to the following figures.

OPERATING PRINCIPLES

Figure 2:
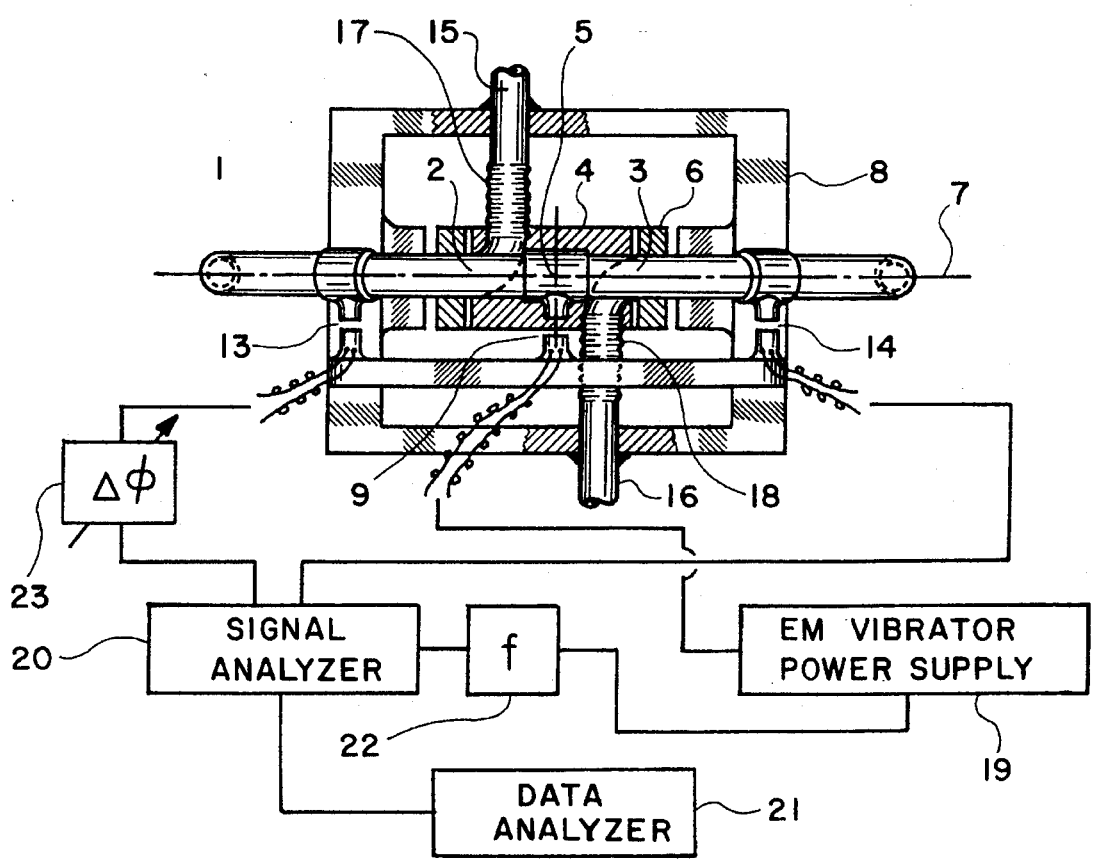
FIG. 2 illustrates an end view of the inertia force flowmeter shown in FIG. 1.

The operating principles of the present invention can be best described by analyzing the equations of pivotal motions of the conduit assembly shown in FIG. 2, wherein the curved conduit 26 of a cardioid shape is pivotally supported about two mutually orthogonal pivot axes 32 and 36 by the supporting structure in a substantially freely pivoting relationship by means of the two sets of bearing-journal combinations 33 and 34, and 37 and 38, which pivotable supporting arrangements are biased by a pair of leaf springs 39 and 40. The equation of motion governing the primary pivotal vibration of the conduit assembly about the second axis 36 generated by the electromagnetic vibrator 41 can be written in the form $$(\rho I_V + I_M)\frac{d^2\theta}{dt^2} + F_\theta \frac{d\theta}{dt} + K_\theta \theta = T_{EM}, \qquad (1)$$

where $\rho$ is the density of media moving through the conduit 26, $I_V$ is the moment of inertia of the flow passage volume within the conduit 26 about the second axis 35, $I_M$ is the moment of inertia of the mass of the conduit assembly about the second axis 36, $\Theta$ is the pivot angle of the conduit assembly about the second axis 36, t is the time, $F_\Theta$ is the friction coefficient of the pivotal motion of the conduit assembly about the second axis 36, $K_\Theta$ is the torsional spring constant about the second axis 36 provided by the pair of leaf springs 39 and 40, and $T_{EM}$ is the torque about the second axis 36 exerted on the conduit assembly by the electromagnetic vibrator 41. The equation of motion governing the secondary pivotal vibration of the conduit assembly about the first axis 32, which secondary pivotal vibration results from a dynamic interaction between the primary pivotal vibration of the conduit 26 about the second axis 36 and the convective motion of the media moving through the flow passage within the conduit 26, can be written in the form $$(\rho J_V + J_M)\frac{d^2\phi}{dt^2} + F_\phi \frac{d\phi}{dt} + K_\phi \phi = -H\dot{M}\frac{d\theta}{dt}, \qquad (2)$$

where $J_V$ is the moment of inertia of the flow passage volume within the conduit 26 about the first axis 32, $J_M$ is the moment of inertia of the mass of the conduit assembly about the first axis 32, $\emptyset$ is the pivot angle of the conduit assembly about the first axis 32, $F_\emptyset$ is the friction coefficient of the pivotal motion of the conduit assembly about the first axis 32, $K_\emptyset$ is the torsional spring constant about the first axis 32 provided by the pair of leaf springs 39 and 40, H is a constant of proportionality intrinsic to the geometry of the conduit 26, and $\dot{M}$ is the mass flow rate of media moving through the flow passage within the conduit 26.

When the vibratory torque $T_{EM}$ exerted on the conduit assembly by the electromagnetic vibrator 41 has a harmonic mode in time, the pivot angle $\theta$ of the primary pivotal vibration of the conduit assembly about the second axis 36, that satisfies equation (1), can be described by equation $$\theta = \theta_o e^{i\omega t}, \qquad (3)$$

where $\theta_O$ is the amplitude of the primary pivotal vibration, e is the base number of the natural logarithm, i is the index of the imaginary number and $\omega$ is the circular frequency of the primary pivotal vibration of the conduit assembly about the second axis 36. Substitution of equation (3) into the right hand side of equation (2) yields the following equation:

$$(\rho J_V + J_M)\frac{d^2\phi}{dt^2} + F_\phi \frac{d\phi}{dt} + K_\phi \phi = -iHM\omega\theta_0 e^{i\omega t}. \tag{4}$$

The pivot angle $\phi$ of the conduit assembly about the first axis 32 satisfying equation (4) is described by equation $$\phi = \phi_0 e^{i(\omega t - \psi)}, \tag{5}$$

where $$\phi_0 = HM\theta_0 / \sqrt{\left[\frac{K_\phi}{\omega} - \omega(\rho J_V + J_M)\right]^2 + (F_\phi)^2}, \tag{6}$$

and $$\tan\psi = \left[\frac{K_\phi}{\omega} - \omega(\rho J_V + J_M)\right] / F_\phi. \tag{7}$$

The two motion or vibration sensors 42 and 43 located respectively at distances $-a$ and $+a$ from the first axis 32 and at a distance $b$ from the second axis 36 detect linear velocities respectively given by the following two equations:

$$v_1 = -a\omega\phi_0 e^{i(\omega t - \psi)} + b\omega\theta_0 e^{i\omega t}, \tag{8}$$

and $$v_2 = +a\omega\phi_0 e^{i(\omega t - \psi)} + b\omega\theta_0 e^{i\omega t}. \tag{9}$$

Equations (8) and (9) can be written in the forms $$v_1 = V_1 e^{i(\omega t - \delta_1)}, \tag{10}$$

and $$v_2 = V_2 e^{i(\omega t - \delta_2)}, \tag{11}$$

where $$V_1 = \omega \sqrt{(b\theta_0)^2 + (a\phi_0)^2 - 2ab\theta_0\phi_0\cos\psi}, \tag{12}$$

$$V_2 = \omega \sqrt{(b\theta_0)^2 + (a\phi_0)^2 + 2ab\theta_0\phi_0\cos\psi}, \tag{13}$$

$$\tan\delta_1 = a\phi_0\sin\psi / (b\theta_0 - a\phi_0\cos\psi), \tag{14}$$

and $$\tan\delta_2 = a\phi_0\sin\psi / (b\theta_0 + a\phi_0\cos\psi). \tag{15}$$

When equations (14) and (15) are substituted into the addition theorem of the tangent function, the following equation results:

$$\tan(\delta_1 + \delta_2) = 2\frac{a\phi_0}{b\theta_0}\sin\psi / \left[1 - \left(\frac{a\phi_0}{b\theta_0}\right)^2\right]. \tag{16}$$

When equation (16) is solved for $(a\phi_0/b\theta_0)$, the following equation is obtained:

$$\frac{a\phi_0}{b\theta_0} = \frac{-\sin\psi \pm \sqrt{\sin^2\psi + \tan^2(\delta_1 + \delta_2)}}{\tan(\delta_1 + \delta_2)}. \tag{17}$$

As indicated by equation (7) wherein the friction coefficient $F_\phi$ has a very small value in general, $\tan^2(\delta_1 + \delta_2)$ has a value much smaller than $\sin\psi$ and, consequently, equation (17) can be approximated by equation $$\frac{a\phi_0}{b\theta_0} = \frac{\tan(\delta_1 + \delta_2)}{2\sin\psi}. \tag{18}$$

It is readily recognized that $(\delta_1 + \delta_2)$ is equal to the phase angle difference between two vibratory velocities respectively measured by the two motion or vibration sensors 42 and 43. When equation (6) is substituted into equation (18), it is easily found that the mass flow rate of media $\dot{M}$ is related to the phase angle difference $\delta = \delta_1 + \delta_2$ between two alternating electrical signals respectively generated by the two motion or vibration sensors 42 and 43 by equation $$\dot{M} = C \tan\delta, \tag{19}$$

where $$C = \frac{b\sqrt{\left[\frac{K_\phi}{\omega} - \omega(\rho J_V + J_M)\right]^2 + (F_\phi)^2}}{2aH\sin\cdot\tan^{-1}\left\{\left[\frac{K_\phi}{\omega} - \omega(\rho J_V + J_M)\right]/F_\phi\right\}}. \tag{20}$$

According to equation (19), the mass flow rate $\dot{M}$ is directly proportional to the tangent of the phase angle difference $\delta$ between two alternating electrical signals respectively generated by the two motion or vibration sensors 42 and 43. In the actual use of equation (19) for determining the mass flow rate of media as a function of the phase angle difference between two alternating electrical signals respectively generated by two motion or vibration sensors located on two opposite sides of a plane including the first axis 32, the constant of proportionality C should be determined by calibrating the flowmeter. In measuring relatively low values of the mass flow rate of media, equation (19) may be approximated by equation $$\dot{M} = C\delta. \tag{21}$$

It has now been shown that the mass flow rate of media moving through a conduit under a primary pivotal vibration about the one of the two mutually orthogonal pivot axes generates a secondary pivotal vibration about the other of the two mutually orthogonal pivot axes, and the numerical value of the mass flow rate of media is directly proportional to the amplitude of the secondary pivotal vibration of the conduit divided by the amplitude of the primary pivotal vibration of the conduit, which amplitude ratio is in turn directly proportional to the phase angle difference in the resultant pivotal vibration of the conduit between the two opposite halves of the conduit respectively located on two opposite sides of a plane including the pivot axis of the secondary pivotal vibration of the conduit. Therefore, the mass flow rate of media can be determined as a function of the phase angle difference between two alternating electrical signals respectively generated by two motion or vibration sensors respectively included in the two opposite halves of the conduit respectively located on two opposite sides of the plane including the pivot axis of the secondary pivotal vibration of the conduit, or as a function of other electrical variable related to the phase angle difference, by using an empirically obtained mathematical equation equivalent to equation (19) or (21). The best result is obtained when the electromagnetic vibrator generates the primary pivotal vibration of the conduit at a frequency equal to a natural frequency of pivotal vibration of the conduit assembly about the axis of the primary pivotal vibration, as the electrical energy put into the electromagnetic vibrator is most efficiently utilized under such a matched condition wherein the mechanical reactance of the conduit assembly vanishes in the primary pivotal vibration. It is noticed in equation (20) that the mechanical reactance of the conduit in the secondary pivotal vibration must not vanish in order to have a nontrivial mathematical relationship between the mass flow rate of media and the phase angle difference between the two alternating electrical signals respectively generated by the two motion or vibration sensors. Therefore, the conduit assembly must have two different values of the mechanical reactance for the primary and secondary pivotal vibrations. The illustrative embodiments of the inertia force flowmeter shown and described in conjunction with FIGS. 1–14 show a few examples of the construction and operation of the inertia force flowmeter operating on the principles of the present invention.

DESCRIPTION OF ILLUSTRATED EMBODIMENTS

Figure 1:
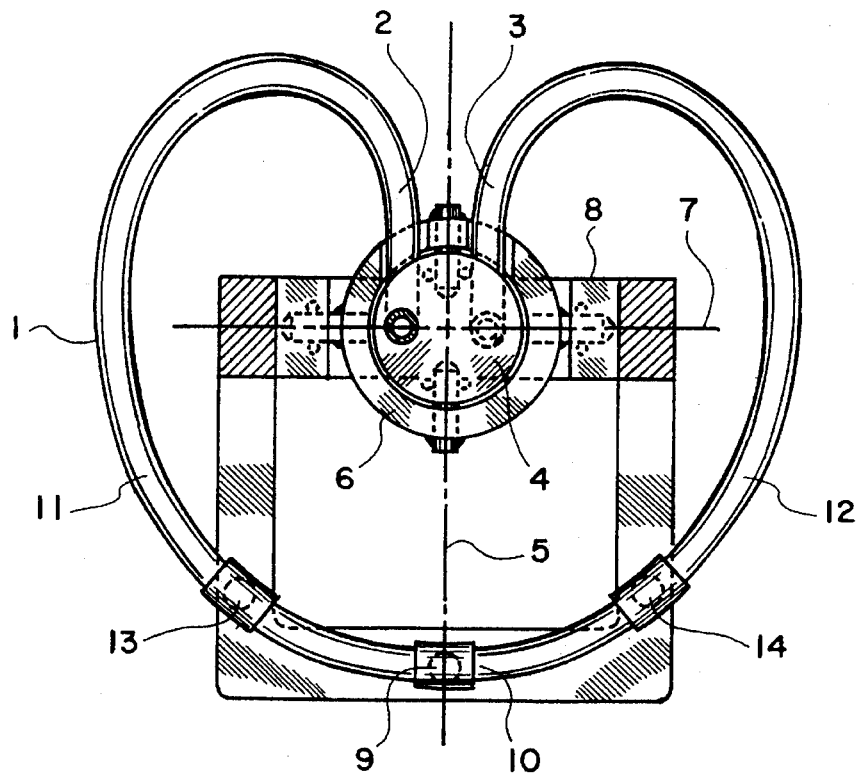
FIG. 1 illustrates a plan view of an embodiment of the inertia force flowmeter comprising a pivotally supported conduit of a cardioid shape.

In FIG. 1 there is illustrated a plan view of an embodiment of the inertia force flowmeter comprising a pivotally supported conduit of a cardioid shape. The conduit 1 of a cardioid shape has two extremities 2 and 3 disposed in a side-by-side arrangement and secured to a supporting block 4 that is supported pivotally about a first axis 5 by a supporting ring 6, which supporting ring 6 is in turn supported pivotally about a second axis 7 by the frame structure 8 of the flowmeter. It should be noticed that the conduit 1 as well as the conduit assembly has a geometry symmetric about a plane including the first axis 5, and the second axis 7 is substantially perpendicular to the first axis 5, and that the conduit assembly comprising the conduit 1, the block 4 and the supporting ring 6 is allowed to pivot in a substantially frictionless manner about any axes lying on a plane defined by the first and second axes 5 and 7, as the supporting block 5 and ring 6 constitutes a gimbal structure mounting the conduit I on the frame structure 8 in a pivotally suspended arrangement. An electromagnetic vibrator 9 with an action and reaction halves respectively affixed to the center section 9 of the conduit 1 and the frame structure 8 generates a primary pivotal vibration of the conduit assembly about the second axis 7. A dynamic interaction between the primary pivotal vibration of the conduit 1 about the second axis 7 and the convective motion of media moving through the flow passage within the conduit 1 generates a secondary pivotal vibration of the conduit assembly about the first axis 5. The two opposite halves 11 and 12 of the conduit 1 respectively located on two opposite sides of a plane including the first axis 5 includes two motion or vibration sensors 13 and 14 disposed symmetrically about the center section 10 of the conduit 1, which motion or vibration sensors may be of a magnetic induction coil type comprising a ferromagnetic element and a coil wound on a permanent magnetic core respectively affixed to the conduit 1 and the frame structure 8, or may be of an accelerometer type including a piezo electric element affixed to the conduit 1.

In FIG. 2 there is illustrated an end view of the inertia force flowmeter shown in FIG. 1. The two opposite extremities 2 and 3 of the conduit 1 anchored to the supporting block 4 are respectively connected to an inlet conduit leg 15 and an outlet conduit leg 16 by means of two bellow connectors 17 and 18, respectively. It should be noticed that the inlet and outlet conduit legs 15 and 16 are anchored to the frame structure 8. In an alternative design, the bellow connectors 17 and 18 may be replaced by a pair of other flexible connectors or rotary connectors allowing at least a small amount of relative movement between the respective extremity of the conduit 1 and the respective conduit leg. The bellow connectors 17 and 18 may be replaced with rigid pipe or tubing connectors, when some degree of sacrifice in the sensitivity of the flowmeter is acceptable in exchange for an additional strength of the flowmeter. The best result is obtained when the flexible or rotary connectors connecting the two extremities 2 and 3 of the conduit 1 to the inlet and outlet conduit legs 15 and 16 are located closely adjacent to the point of intersection between the two mutually orthogonal pivot axes 5 and 7, whereat the relative movement between each extremity of the conduit 1 and each conduit leg is limited to a very small magnitude. An electromagnetic vibrator power supply 19 energizes the electromagnetic vibrator 9 with an alternating electric current. A signal analyzer 20 extracts an electrical variable representing the normalized level of the secondary pivotal vibration of the conduit 1 about the first axis 5 from two alternating electrical signals respectively generated by the two motion or vibration sensors 13 and 14. The most preferred form of such an electrical variable is the phase angle difference between the two alternating electrical signals respectively generated by the two motion or vibration sensors 13 and 14, or other electrical variable directly related to the phase angle difference. A data analyzer 21 determines the mass flow rate of media moving through the conduit 1 as a function of the electrical variable such as the phase angle difference provided by the signal analyzer 20. A natural frequency detector 22 may detect a natural frequency of the pivotal vibration of the conduit assembly about the second axis 7 from one or both of the two alternating electrical signals respectively generated by the two motion or vibration sensors 13 and 14, and feed the information on the natural frequency to the electromagnetic vibrator power supply 19 so that the electromagnetic vibrator 9 generates the primary pivotal vibration of the conduit 1 about the second axis 7 at a natural frequency thereof. The most preferred form of the electrical variable, that determines the mass flow rate of media, is the phase angle difference between two alternating electrical signals respectively generated by the two motion or vibration sensors 13 and 14. When the signal analyzer 20 provides the phase angle difference between the two alternating electrical signals as the electrical variable determining the mass flow rate of media, a variable artificial phase angle imposing device 23 imposing an artificial phase angle to one of the two alternating electrical signals respectively generated by the two motion or vibration sensors 13 and 14 may be included, whereby the zero value of the phase angle difference provided by the signal analyzer 20 is artificially set in such a way that the zero value of the phase angle difference occurs when the mass flow rate of media is equal to zero. It should be mentioned that, in an alternative design, the supporting ring 6 may be fixedly connected to the frame structure 8, whereby the primary pivotal vibration of the conduit 1 about the second axis 7 occurs in the form of elastic deflective vibration of the conduit 1, while the secondary pivotal vibration of the conduit 1 about the first axis 5 occurs in a substantially freely pivoting relationship about the first axis 5. In another alternative design, the supporting block 4 may be fixedly connected to the supporting ring 6, or the supporting block 4 and the supporting ring 6 may be integrated into a single supporting structure, whereby the primary pivotal vibration of the conduit 1 about the second axis 7 occurs in a substantially freely pivoting relationship about the second axis 7, while the secondary pivotal vibration of the conduit 1 about the first axis 5 occurs in a form of elastic deflective vibration of the conduit 1. As exemplified by the embodiment shown in FIG. 3, one or more elastic spring members biasing the primary and/or secondary pivotal vibrations of the conduit assembly may be incorporated into the version shown in FIG. 1 or into the afore-mentioned alternative design versions thereof.

Figure 3:
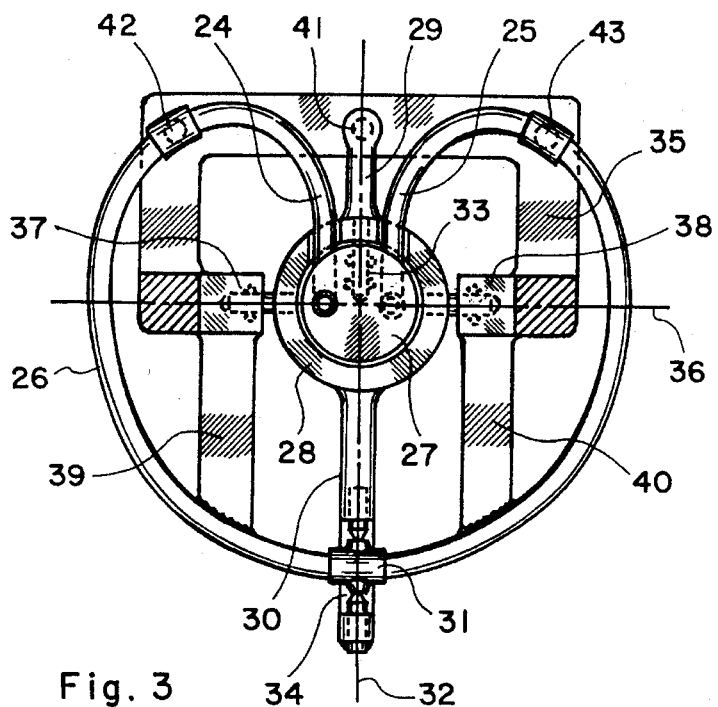
FIG. 3 illustrates another embodiment of the inertia force flowmeter comprising a pivotally supported conduit of a cardioid shape.

In FIG. 3 there is illustrated another embodiment of the inertia force flowmeter comprising a pivotally supported conduit of a cardioid shape. The two extremities 24 and 25 of the cardioid shaped conduit 26 are anchored to the supporting block 27 that is supported pivotally about the first axis 32 by the supporting ring 28 with two extensions 29 and 30 respectively extending in two diametrically opposite directions parallel to the first axis 32. It should be noticed that the supporting ring 28 supports the combination of the conduit 26 and the supporting block 27 in a substantially frictionless pivotable arrangement about the first axis 32 by means of the frictionless bearing 33 supporting the block 27 and the frictionless bearing 34 included in the extremity of the extension 30 supporting the center section 31 of the conduit 26. The supporting ring 28 is in turn supported pivotally about the second axis 36 by the frame structure 35 in a substantially freely pivoting relationship by means of the pair of frictionless bearings 37 and 38. A pair of leaf springs 39 and 40 elastically biases the substantially frictionless pivotal vibrations of the conduit assembly about the two mutually orthogonal pivot axis 32 and 36. As the supporting block 27 and the supporting ring 28 are mechanically coupled to one another pivotally about the first axis 32 and nonpivotally about the second axis 36, it is possible to generate the primary pivotal vibration of the conduit 26 about the second axis 36 by an electromagnetic vibrator 41 included in the extremity of the extension 29 extending from the supporting ring 28 in a direction parallel to the first axis 32. It is readily recognized that the electromagnetic vibrator 41 may be relocated to a midsection or to the extremity of the other extension 30 pivotally supporting the center section 31 of the conduit 26 about the first axis. It should be understood that both of the primary and secondary pivotal vibrations of the conduit assembly are elastically biased by the pair of leaf springs 39 and 40. Two motion or vibration sensors 42 and 43 respectively included in the two opposite halves of the conduit 26 in a relationship symmetric about a plane including the first axis 32 provides two alternating electrical signals. In an alternative design, one of the two frictionless pivoting supports about the two mutually orthogonal pivot axes 32 and 36 may be omitted or replaced by a fixed mechanical joint, which alternative design may or may not include the leaf springs 39 and 40.

Figure 4:
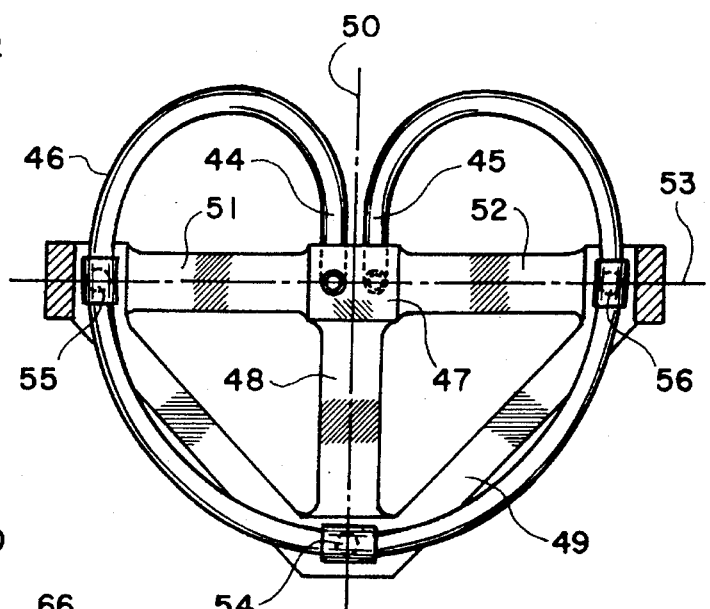
FIG. 4 illustrates a further embodiment of the inertia force flowmeter comprising a pivotally supported conduit of a cardioid shape.

In FIG. 4 there is illustrated a further embodiment of the inertia force flowmeter comprising a pivotally supported conduit of a cardioid shape. The two opposite extremities 44 and 45 of the conduit 46 are disposed in a side-by-side arrangement and secured to the supporting block 47 that is supported by a leaf spring 48 with two opposite ends respectively affixed to the supporting block 47 and the frame structure 49, which leaf spring 48 is disposed following the first axis 50, and by a pair of leaf springs 51 and 52 disposed following the second axis 53, wherein the two opposite ends of each of the pair of leaf springs 51 and 52 are respectively affixed to the supporting block 47 and the frame structure 49. An electromagnetic vibrator 54 generates the primary pivotal vibration of the conduit 46 about the second axis 53, while a pair of motion or vibration sensors 55 and 56 provide the information on the secondary pivotal vibration of the conduit 46 about the first axis 50. It should be understood that the first pivot axis 50 is defined by the torsion axis of the leaf spring 48, while the second pivot axis 53 is defined by the common torsion axis of the pair of leaf springs 51 and 52. It is readily recognized that, in an alternative design, the leaf spring 48 may be omitted or replaced by a frictionless bearing support about the first axis 50. In another alternative design, the pair of leaf springs 51 and 52 may be omitted or replaced by a frictionless bearing support about the second axis 53. It should be understood that the conduit assembly under pivotal vibration about two mutually orthogonal pivot axes may be supported pivotally about only one of the two mutually orthogonal pivot axes, or may be supported pivotally about one of the two pivot axes by means of the frictionless bearings and about the other of the two pivot axes by means of the leaf springs or fixed mechanical connection.

Figure 5:
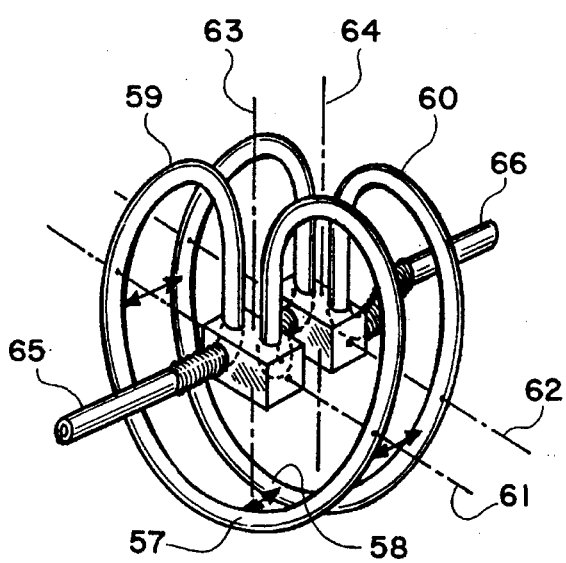
FIG. 5 illustrates an embodiment of the inertia force flowmeter comprising a pair of pivotally supported conduits of a cardioid shape.

In FIG. 5 there is illustrated a embodiment of the inertia force flowmeter comprising a pair of pivotally supported conduits of a cardioid shape, each of which pair of conduits has the construction shown in FIG. 1, 3 or 4, or an alternative design version thereof. An electromagnetic vibrator with an action and reaction halves respectively affixed to the center sections 57 and 58 of the pair of identical and parallel conduits 59 and 60 generates a primary relative pivotal vibrations between the pair of conduits 59 and 60 about the respective pivot axes 61 and 62, while a pair of relative motion or vibration sensors respectively included in the two opposite halves of the combination of the pair of conduits 59 and 60 measure the secondary relative pivotal vibration between the pair of conduits 59 and 60 about the respective pivot axes 63 and 64 respectively at two locations located symmetrically about a plane defined by two pivot axes 63 and 64 of the secondary relative pivotal vibration. It should be noticed that each of the pair of conduits 59 and 60 has a geometry symmetric about the plane defined by the two pivot axes 63 and 64. The mass flow rate of media is determined as a function of an electrical variable such as the phase angle difference between two alternating electrical signals respectively generated by the two relative motion or vibration sensors, which electrical variable represents the normalized level of the secondary relative pivotal vibration between the pair of conduits 59 and 60 about the respective pivot axes 63 and 64 of the secondary pivotal vibration of the individual conduit. In the particular illustrative embodiment shown and described, the pair of conduits 59 and 60 under the relative pivotal vibration connect the inlet conduit leg 65 to the outlet conduit leg 66 in a series connection, wherein the outlet end of the first conduit 59 is connected to the inlet end of the second conduit 60 by a flexible or rotary connector. In an alternative design, the pair of conduits 59 and 60 may connect the inlet conduit leg 65 to the outlet conduit leg 66 in a parallel connection, wherein the inlet ends of the pair of conduits 59 and 60 are simultaneously connected to the common inlet conduit leg 65 and the outlet ends of the pair of conduits 59 and 60 are simultaneously connected to the common outlet conduit leg 66.

Figure 6:
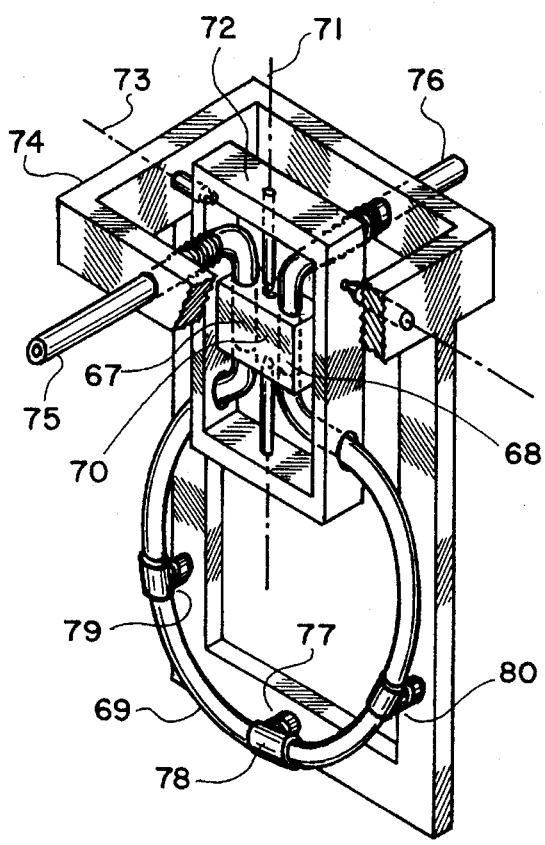
FIG. 6 illustrates an embodiment of the inertia force flowmeter comprising a pivotally supported conduit having the shape of the rim of a tennis racket.

In FIG. 6 there is illustrated an embodiment of the inertia force flowmeter comprising a pivotally supported conduit having the shape of a rim of a tennis racket. The pan-handle portions 67 and 68 of the conduit 69 are disposed in a side-by-side arrangement and secured to the supporting block 70 that is supported pivotally about the first axis 71 by the supporting ring 72. In turn, the supporting ring 72 is supported pivotally about the second axis 73 perpendicular to the first axis 71 by the frame structure 74. It should be noticed that the two opposite ends of the conduit 69 are respectively connected to the inlet conduit leg 75 and outlet conduit leg 76 by means of two flexible or rotary pipe or tubing connectors disposed closely adjacent to the point of intersection between the two mutually orthogonal pivot axes 71 and 73, which arrangement minimizes the flexural or rotary movements of the flexible or rotary connectors allowing relative movements between the ends of the conduit 69 and the inlet and outlet conduit legs 75 and 76. It should be also noticed that the geometry of the conduit 69 is symmetric about a plane including the first pivot axis 71. An electromagnetic vibrator 77 located at the center section 78 of the conduit 69 generates the primary pivotal vibration of the conduit 69 about the second axis 73, while a pair of motion or vibration sensors 79 and 80 disposed symmetrically about a plane including the first axis 71 respectively generate two alternating electrical signals representing the secondary pivotal vibration of the conduit 69 about the first axis 71. The mass flow rate of media is determined as a function of an electrical variable such as the phase angle difference between the two alternating electrical signals respectively generated by the two motion or vibration sensors 79 and 80, which electrical variable represents the normalized level of the secondary pivotal vibration of the conduit 69 about the first axis 71. In an alternative design, one or both of the two frictionless bearing supports about the two mutually orthogonal pivot axes 71 and 73 may be replaced or complemented with one or more leaf springs as explained in conjunction with FIGS. 1, 2 and 3. In another alternative design, one of the two frictionless bearing supports about the two pivot axes 71 and 73 may be replaced by a fixed mechanical support about that pivot axis.

Figure 7:
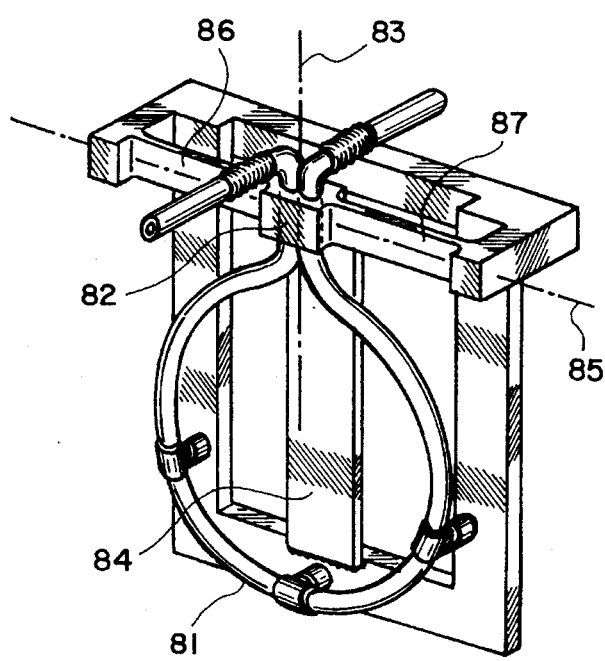
FIG. 7 illustrates another embodiment of the inertia force flowmeter comprising a pivotally supported conduit having the shape of the rim of a tennis racket.

In FIG. 7 there is illustrated another embodiment of the inertia force flowmeter comprising a pivotally supported conduit having the shape of a rim of a tennis racket. The two opposite extremities of the conduit 81 are disposed in a side-by-side relationship and anchored to the supporting block 82 that is supported pivotally about the first axis 83 by a leaf spring 84 and about the second axis 85 by a pair of leaf springs 86 and 87 in the same manner as that described in conjunction with FIG. 4. This embodiment of the inertia force flowmeter operates in the same manner as that of the embodiment shown in FIG. 6. In an alternative embodiment, the leaf spring 84 may be omitted. In another alternative design, one of the leaf spring 84 and the pair of leaf springs 86 and 87 may be replaced by a frictionless bearing support.

Figure 8:
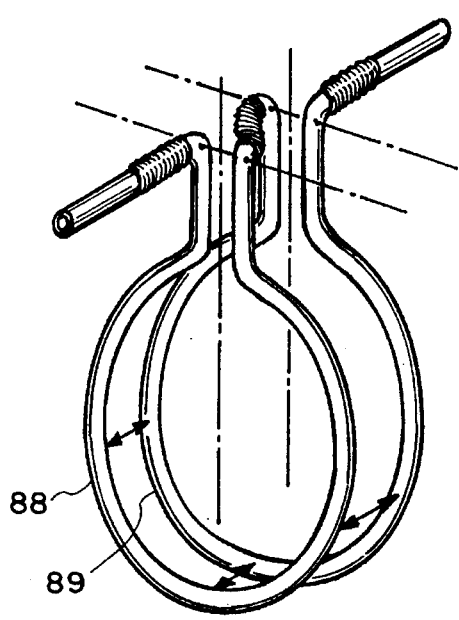
FIG. 8 illustrates an embodiment of the inertia force flowmeter comprising a pair of pivotally supported conduits having the shape of the rim of a tennis racket.

In FIG. 8 there is illustrated an embodiment of the inertia force flow meter comprising a pair of pivotally supported identical and parallel conduits 88 and 89 having the shape of a rim of a tennis racket. This embodiment is the counter-part of the embodiment shown in FIG. 5, wherein the pair of cardioid shaped conduits are now replaced by the pair of conduits 88 and 89 having the shape of a rim of a tennis racket. While the particular illustrative embodiment shows the pair of conduits 88 and 89 arranged in a series connection, the pair of conduits 88 and 89 may be arranged in a parallel connection in an alternative design as explained in conjunction with FIG. 5.

Figure 9:
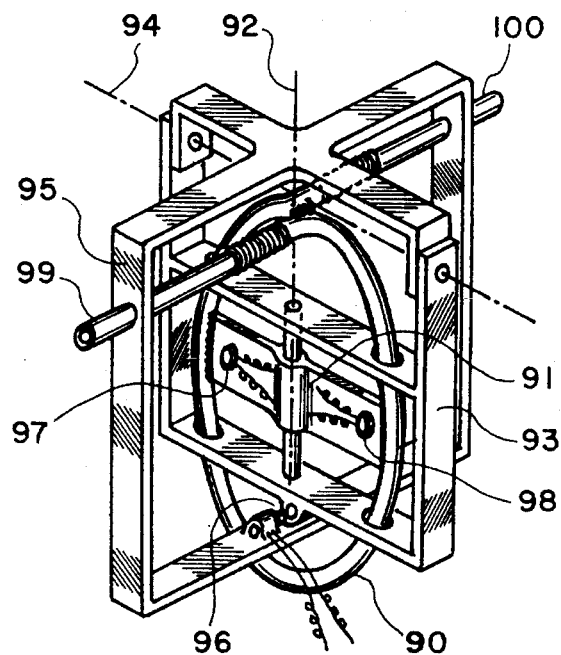
FIG. 9 illustrates an embodiment of the inertia force flowmeter comprising a pivotally supported conduit of a ring shape.

In FIG. 9 there is illustrated an embodiment of the inertia force flowmeter comprising a pivotally supported conduit of a ring shape. The ring shaped conduit 90 includes a supporting bar or plate 91 disposed parallel to and rigidly connected to the conduit 90, wherein the supporting bar or plate 91 is supported pivotally about the first axis 92 by the supporting bracket 93 that is in turn supported pivotally about the second axis 94 by the frame structure 95. An electromagnetic vibrator 96 disposed on a plane including the first axis 92 generates the primary pivotal vibration of the conduit 90 about the second axis 94, while a pair of motion or vibration sensors 97 and 98 of an accelerometer type affixed to the supporting bar or plate 91 in a relationship symmetric about a plane including the first axis 92 respectively generate two alternating electrical signals providing an electrical variable such as the phase angle difference therebetween that determines the mass flow rate of media moving through the conduit 90. It should be again noticed that the two flexible or rotary connectors connecting the two opposite ends of the conduit 90 to the inlet and outlet conduit legs 99 and 100 are disposed closely adjacent to the point of intersection between the two mutually orthogonal pivot axes 92 and 94. It should be also noticed that the geometry of the conduit 90 is symmetric about the plane including the first axis 92. It is readily recognized that the particular illustrative embodiment is equivalent to the embodiment shown in FIG. 6, as the conduit of a ring shaped geometry results when the pan-handle portions of the conduit having the shape of a rim of a tennis racket are omitted. Therefore, all of the design alternatives described in conjunction with the embodiment shown in FIG. 6 can also be incorporated into the particular illustrative embodiment.

Figure 10:
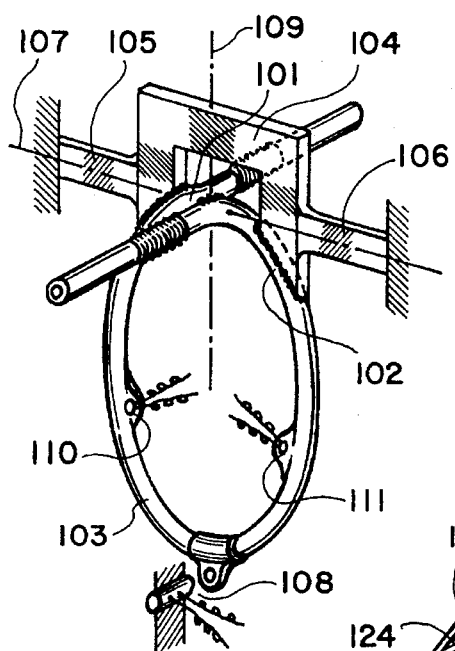
FIG. 10 illustrates another embodiment of the inertia force flowmeter comprising a pivotally supported conduit of a ring shape.

In FIG. 10 there is illustrated another embodiment of the inertia force flowmeter comprising a pivotally supported conduit of a ring shape, which embodiment results when the pan-handle portions of the conduit included in the embodiment shown in FIG. 7 are omitted. The two opposite extremities 101 and 102 of the conduit 103 are weld-connected to a supporting bracket 104 that is supported by a pair of leaf springs 105 and 106 disposed along the second axis 107. The electromagnetic vibrator 108 disposed on a plane including the first axis 109 generates the primary pivotal vibration of the conduit 103 about the second axis 107, while a pair of motion or vibration sensors 110 and 111 of an accelerometer type respectively affixed to the two opposite halves of the conduit 103 symmetrically about the plane including the first axis 109 generate two alternating electrical signals providing an electrical variable such as the phase angle difference therebetween that determines the mass flow rate of media. It is readily recognized that an additional leaf spring supporting the bracket 104 may be disposed along the first axis 109. It is also clear that, in an alternative design, the bracket 104 may be supported by a gimbal structure allowing frictionless pivoting vibration about the two mutually orthogonal pivot axes 107 and 109.

Figure 11:
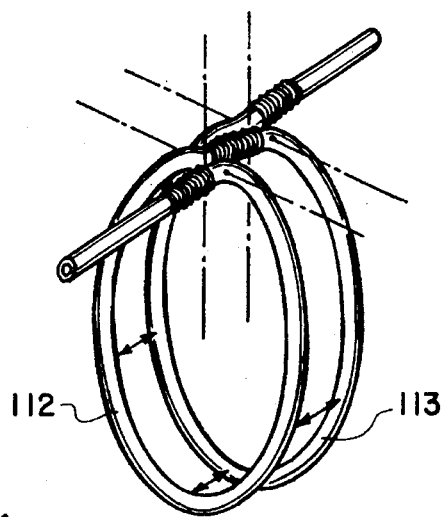
FIG. 11 illustrates an embodiment of the inertia force flowmeter comprising a pair of pivotally supported conduits of a ring shape.

In FIG. 11 there is illustrated an embodiment of the inertia force flowmeter comprising a pair of pivotally supported identical and parallel conduits 112 and 113 of a ring geometry, which embodiment results when the pan-handle portions of the pair of conduits 88 and 89 included in the embodiment shown in FIG. 8 are omitted. The pair of ring shaped conduits 110 and 111 may be disposed in a series connection as shown in the particular illustrative embodiment, or in a parallel connection in an alternative design as explained in conjunction with FIG. 5.

Figure 12:
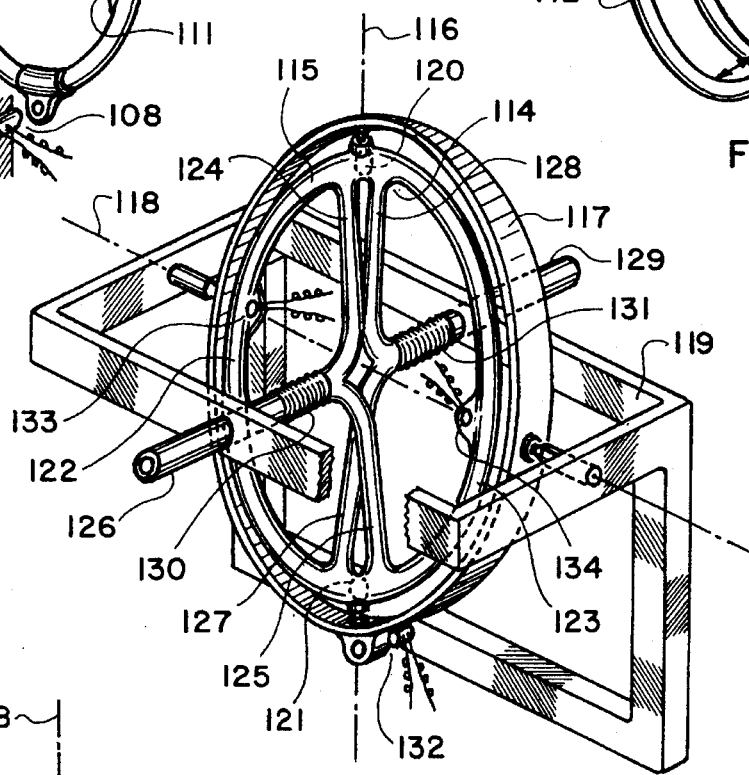
FIG. 12 illustrates an embodiment of the inertia force flowmeter comprising a pivotally supported conduit of an axisymmetric geometry.

In FIG. 12 there is illustrated an embodiment of the inertia force flowmeter comprising a pivotally supported conduit of an axisymmetric geometry. The conduit 114 comprises a circular or oval loop 111 supported pivotally about the first axis 116 by a supporting ring 117 that is in turn supported pivotally about the second axis 118 perpendicular to the first axis 116 by the frame structure 119. A pair of conduit plugs 120 and 121 plugs up the circular or oval loop 115 of the conduit 114 at two diametrically opposite locations located on a plane including the first axis 116, which pair of conduit plugs 120 and 121 divide the the circular or oval loop 115 of the conduit 114 into two equal opposite halves 122 and 123 sealed off from one another in a geometric relationship symmetric about a plane including the first axis 116. The conduit 114 also includes a first pair of radial legs 124 and 125 extending from the central axis of the circular or oval loop 115 respectively in two opposite radial directions, wherein the radial leg 124 connects the common inlet conduit leg 126 to one extremity of the first half 122 of the circular or oval loop 115 adjacent to the plug 120, while the radial leg 125 connects the common inlet conduit leg 126 to one extremity of the second half 123 of the circular or oval loop 115 adjacent to the plug 121. The conduit 114 further includes a second pair of radial legs 127 and 128 extending from the central axis of the circular or oval loop 115 respectively in two opposite radial directions, wherein the radial leg 127 connects the other extremity of the first half 122 of the circular or oval loop 115 adjacent to the plug 121 to the common outlet conduit leg 129, while the radial leg 128 connects the other extremity of the second half 123 of the circular or oval loop 115 adjacent to the plug 120 to the common outlet conduit leg 129. It should be noticed that the inlet and outlet conduit legs 126 and 129 are disposed coaxially with respect to the central axis of the circular or oval loop 115 of the conduit 114, and are respectively connected to the first and second pairs of radial legs of the conduit 114 by two flexible or rotary connectors 130 and 131 disposed coaxially to the central axis of the circular or oval loop 115 of the conduit 114, which flexible or rotary connectors 130 and 131 are located closely adjacent to the point of intersection between the two mutually orthogonal pivot axes 116 and 118. In essence, the conduit 114 comprises a pair of semicircular flow loops assembled into an axisymmetric geometry having a circular or oval circumference on a plane defined by the two mutually perpendicular pivot axes 116 and 118, wherein the resultant geometry of the conduit 114 is symmetric about the first axis 116, and the inlet and outlet of each of the pair of semicircular flow loops are disposed at the center of the circular or oval circumference of the flow loop assembly and are respectively connected to the common inlet and outlet conduit legs disposed coaxially or concentrically to the circular or oval circumference of the flow loop assembly respectively by two flexible or rotary pipe or tubing connectors. It should be noticed that the conduit 114 has a geometry axisymmetric about the central axis perpendicular to a plane defined by the two mutually orthogonal pivot axes 116 and 118, and passing through the point of intersection between the two pivot axes 116 and 118, and symmetric about a plane including the first pivot axis 116. An electromagnetic vibrator 132 disposed on the plane including the first pivot axis 116 generates the primary pivotal vibration of the conduit 114 about the second pivot axis 118, while a pair of motion or vibration sensors 133 and 134 respectively included in the two opposite halves of the conduit 114 in a relationship symmetric about the plane including the first pivot axis 116 respectively generate two alternating electrical signals providing an electrical variable such as the phase angle difference therebetween that determines the mass flow rate of media moving through the conduit 114. In an alternative design, one or both of the frictionless bearing supports about the two pivot axes 116 and 118 may be replaced by or complemented with one or more leaf springs as suggested by the embodiment shown in FIGS. 3 and 4. In another alternative design, one of the two frictionless bearing supports about the two pivot axes 116 and 118 may be omitted or replaced with a fixed mechanical support about that pivot axis. The above-mentioned modifications of the supporting arrangements can be incorporated into all of the different illustrative embodiments shown in FIGS. 1–14.

Figure 13:
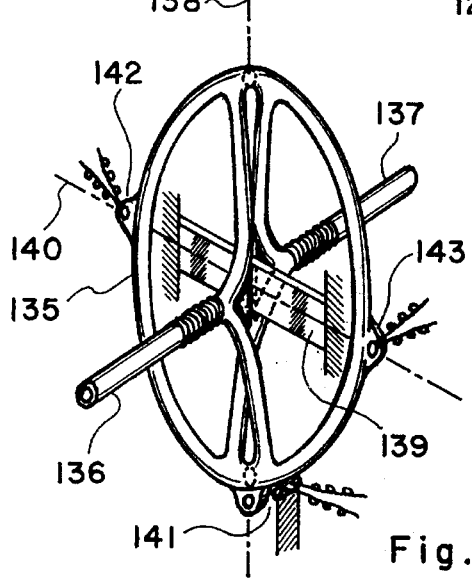
FIG. 13 illustrates another embodiment of the inertia force flowmeter comprising a pivotally supported conduit of an axisymmetric geometry.

In FIG. 13 there is illustrated another embodiment of the inertia force flowmeter comprising a pivotally supported conduit having an axisymmetric geometry. The conduit 135 and the inlet and outlet conduit legs 136 and 137 are assembled into the same construction as that of corresponding elements included in the embodiment shown in FIG. 12 and, consequently, the conduit assembly of the particular illustrative embodiment is axisymmetric about the common center line of the inlet and outlet conduit legs 136 and 137, and symmetric about a plane including the first pivot axis 138. The conduit 135 is supported by a leaf spring or bar spring 139 with a torsion axis substantially coinciding with the second pivot axis 140 perpendicular to the first pivot axis 138, wherein the leaf spring or bar spring 139 extends through a space between the two pairs of radial legs included in the conduit 135, and the central portion of the two pairs of radial legs are weld-connected to the midsection of the leaf spring or bar spring 139 that is secured to the frame structure at the two opposite ends thereof. An electromagnetic vibrator 141 disposed on a plane including the first axis 138 generates the primary pivotal vibration of the conduit 135 about the second axis 140, while a pair of motion or vibration sensors 142 and 143 included in the two equal opposite halves of the conduit 135 in a relationship symmetric about the plane including the first axis 138 respectively generate two alternating electrical signals providing an electrical variable such as the phase angle difference therebetween, that determines the mass flow rate of media moving through the conduit 135. It is readily recognized that the leaf spring 139 may be replaced by a frictionless bearing support about the second axis 140 in an alternative design, wherein the secondary pivotal vibration of the conduit 135 about the first axis 138 occurs in the form of an elastic deflective vibration of the conduit 135 in two opposite directions perpendicular to the plane defined by the two mutually orthogonal pivot axes 138 and 140.

Figure 14:
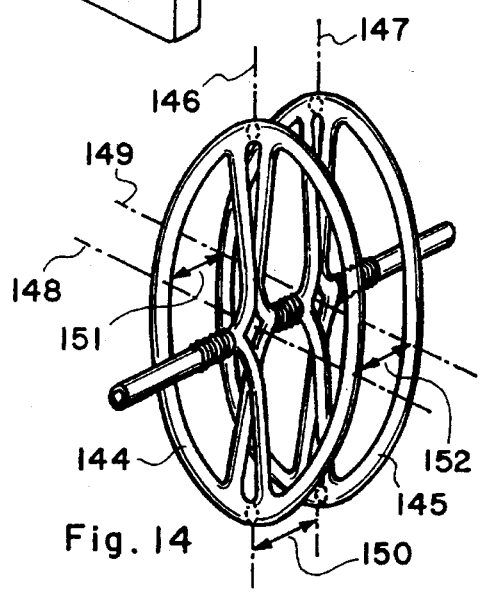
FIG. 14 illustrates an embodiment of the inertia force flowmeter comprising a pair of pivotally supported conduits of an axisymmetric geometry.

In FIG. 14 there is illustrated an embodiment of the inertia force flowmeter comprising a pair of pivotally supported conduits having an axisymmetric geometry. Each of the pair of conduits 144 and 145 has the same construction as that of the conduit included in the embodiment shown and described in conjunction with FIG. 12 or 13, and is pivotally disposed about the respective first axis 146 or 147 and about the respective second axis 148 or 149. An electromagnetic vibrator 150 disposed on a plane defined by the first pivot axes 146 and 147 generates the primary relative pivotal vibration between the pair of conduits 144 and 145 about the respective second axes 148 and 149, while a pair of relative motion or vibration sensors 151 and 152 disposed symmetrically about the plane defined by the first axes 146 and 147 respectively generate two alternating electrical signals providing an electrical variable such as the phase angle difference therebetween that determines the mass flow rate of media. It should be mentioned once again that the mass flow rate of media is determined as a function of an electrical variable representing the normalized level of the secondary relative pivotal vibration between the pair of conduits 144 and 145 about the respective first axes 146 and 147, wherein the nomalized level of the secondary relative pivotal vibration is defined as the ratio of the amplitude of the secondary relative pivotal vibration to the amplitude of the primary relative pivotal vibration between the pair of conduits 144 and 145. In the particular illustrative embodiment, the pair of conduits 144 and 145 are assembled into a series connection. In an alternative design, the pair of conduits 144 and 145 may be assembled into a parallel connection as explained in conjunction with FIG. 5. It should be understood that, in the various illustrative embodiments shown and described herein, the mass flow rate of media is determined as a function of an electrical variable representing the normalized level of the secondary absolute or relative pivotal vibration, wherein the normalized level of the secondary pivotal vibration is defined as the ratio of the amplitude of the secondary pivotal vibration to the amplitude of the primary pivotal vibration of the conduit or conduits. While the most preferred form of the electrical variable determining the mass flow rate is the phase angle difference between the two alternating electrical signals respectively generated by the two absolute or relative motion or vibration sensors, other electrical variables related to the phase angle difference may be used to determine the mass flow rate of media. It must be understood that, while the best result is obtained when the two opposite ends of the conduit under pivotal vibration are connected to the inlet and outlet conduit legs by the flexible or rotary pipe or tubing connectors, the two opposite ends of the conduit may be connected to the inlet and outlet conduit legs by the rigid pipe or tubing connectors when some degree of sacrifice in the sensitivity of the inertia flowmeter resulting from the omission of the flexible or rotary connectors is acceptable in exchange for an added structural strength provided by the rigid connectors.

While the principles of the inventions have now been made clear by the illustrative embodiments shown and described, there will be many modifications of the structures, arrangements, proportions, elements and materials, which are immediately obvious to those skilled in the art and particularly adapted to the specific working environments and operating conditions in the practice of the inventions without departing from those principles. It is not desired to limit the inventions to the particular illustrative embodiments shown and described and accordingly, all suitable modifications and equivalents may be regarded as falling within the scope of the inventions as defined by the claims which follow.

The embodiments of the inventions, in which an exclusive property or privilege is claimed, are defined as follows:

1. An apparatus for measuring flow rate of media comprising in combination:
   a) a substantially rigid structure disposed in a relationship allowing at least minimal amount of pivotal vibrations about a first axis and a second axis perpendicular to one another, and including at least one elongated flow passage disposed in a symmetric relationship about a plane including the first axis; wherein an inlet and outlet of the elongated flow passage are disposed adjacent to said plane;
   b) at least one mechanical support means comprising at least one of a substantially freely pivoting joint and an elastically biased pivotable joint supporting the substantially rigid structure about at least one of the first and second axes in a relationship allowing an enhanced pivotal vibration of the substantially rigid structure about said one of the first and second axes;
   c) means for exerting a vibratory force on the substantially rigid structure at said plane for generating a primary pivotal vibration of the substantially rigid structure about the second axis; and
   d) means for measuring a level of a secondary pivotal vibration of the substantially rigid structure about the first axis as a measure of mass flow rate of media moving through the elongated flow passage.

2. An apparatus as defined in claim 1 including means for determining the mass flow rate of said media as a function of the level of the secondary pivotal vibration of the substantially rigid structure about said first axis.

3. An apparatus as defined in claim 1 wherein said means for measuring a level of the secondary pivotal vibration comprises a pair of vibration sensors respectively included in two opposite halves of the substantially rigid structure respectively located on two opposite sides of said plane.

4. An apparatus as defined in claim 3 including means for determining the mass flow rate of said media as a function of an electrical variable representing a phase angle difference between two alternating electrical signals respectively generated by the pair of vibration sensors.

5. An apparatus as defined in claim 1 wherein the substantially rigid structure is free of any mechanical restraints hindering a pivotal vibration of the substantially rigid structure about the other one of the first and second axes different from said one of the first and second axes.

6. An apparatus as defined in claim 5 including means for determining the mass flow rate of said media as a function of the level of the secondary pivotal vibration of the substantially rigid structure about said first axis.

7. An apparatus as defined in claim 5 wherein said means for measuring a level of the secondary pivotal vibration comprises a pair of vibration sensors respectively included in two opposite halves of the substantially rigid structure respectively located on two opposite sides of said plane.

8. An apparatus as defined in claim 7 including means for determining the mass flow rate of said media as a function of an electrical variable representing a phase angle difference between two alternating electrical signal respectively generated by the pair of vibration sensors.

9. An apparatus as defined in claim 1 wherein said combination includes another mechanical support means comprising at least one of a substantially freely pivoting joint and an elastically biased pivotable joint pivotally supporting the substantially rigid structure about the other one of the first and second axes different from said one of the first and second axes in a relationship allowing an enhanced pivotal vibration of the substantially rigid structure about said other one of the first and second axes.

10. An apparatus as defined in claim 9 including means for determining the mass flow rate of said media as a function of the level of the secondary pivotal vibration of the substantially rigid structure about the first axis.

11. An apparatus as defined in claim 9 wherein said means for measuring a level of the secondary pivotal vibration comprises a pair of vibration sensors respectively included in two opposite halves of the substantially rigid structure respectively located on two opposite sides of said plane.

12. An apparatus as defined in claim 11 including means for determining the mass flow rate of said media as a function of an electrical variable representing a phase angle difference between two alternating electrical signals respectively generated by the pair of vibration sensors.

13. An apparatus as defined in claim 1 wherein said combination includes another substantially rigid structure disposed in a mirror image to said a substantially rigid structure with a space therebetween, said another substantially rigid structure including at least one elongated flow passage and having a construction substantially identical to the construction of said a substantially rigid structure, and supported by another at least one mechanical support means identical to said at least one mechanical support means in a relationship allowing an enhanced pivotal vibration of said another substantially rigid structure about at least one axis parallel to said one of the first and second axes; wherein said means for exerting a vibratory force exerts a vibratory force on said a substantially rigid structure and another substantially rigid structure in an action-reaction relationship and generates a primary relative pivotal vibration between said a substantially rigid structure and another substantially rigid structure about the respective second axes, and said means for measuring a level of the secondary pivotal vibration measures a level of secondary relative pivotal vibration between said a substantially rigid structure and another substantially rigid structure about the respective first axes as a measure of mass flow rate of media moving through at least one of the elongated flow passages respectively included in said a substantially rigid structure and another substantially rigid structure.

14. An apparatus as defined in claim 13 including means for determining the mass flow rate of said media as a function of the level of the secondary relative pivotal vibration between said a substantially rigid structure and another substantially rigid structure about the respective first axes.

15. An apparatus as defined in claim 13 wherein said means for measuring a level of the secondary pivotal vibration comprises a pair of relative vibration sensors respectively included in two opposite halves of the combination of said a substantially rigid structure and another substantially rigid structure respectively located on two opposite sides of a plane defined by the respective first axes.

16. An apparatus as defined in claim 15 including means for determining the mass flow rate of said media as a function of an electrical variable representing a phase angle difference between two alternating electrical signals respectively generated by the pair of relative vibration sensors.

17. An apparatus as defined in claim 13 wherein each of said a substantially rigid structure and another substantially rigid structure is free of any mechanical restraints hindering a relative pivotal vibration between said a substantially rigid structure and another substantially rigid structure about the respective other axes different from said respective one axes.

18. An apparatus as defined in claim 17 including means for determining the mass flow rate of said media as a function of the level of the secondary relative pivotal vibration between said a substantially rigid structure and another substantially rigid structure about the respective first axes.

19. An apparatus as defined in claim 17 wherein said means for measuring a level of the secondary pivotal vibration comprises a pair of relative vibration sensors respectively included in two opposite halves of the combination of said a substantially rigid structure and another substantially rigid structure respectively located in two opposite sides of a plane defined by the respective first axes; and said combination includes means for determining the mass flow rate of said media as a function of an electrical variable representing a phase angle difference between two alternating electrical signals respectively generated by the pair of relative vibration sensors.

20. An apparatus as defined in claim 13 wherein each of said a substantially rigid structure and another substantially rigid structure includes another mechanical support means comprising at least one of a substantially freely pivoting joint and an elastically biased pivotable joint pivotally supporting each of said a substantially rigid structure and another substantially rigid structure about the respective other axes different from said respective one axes in a relationship allowing an enhanced relative pivotal vibration between said a substantially rigid structure and another substantially rigid structure about said the respective other axes.

21. An apparatus as defined in claim 20 including means for determining the mass flow rate of said media as a function of the level of the secondary relative pivotal vibration between said a substantially rigid structure and another substantially rigid structure about the respective first axes.

22. An apparatus as defined in claim 20 wherein said means for measuring a level of the secondary pivotal vibration comprises a pair of relative vibration sensors respectively included in two opposite halves of the combination of said a substantially rigid structure and another substantially rigid structure respectively located on two opposite sides of a plane defined by the respective first axes; and said combination includes means for determining the mass flow rate of said media as a function of an electrical variable representing a phase angle difference between two alternating electrical signals respectively generated by the pair of relative vibration sensors.

* * * * *